United States Patent [19]

Satterlee

[11] 4,111,927

[45] Sep. 5, 1978

[54] EXTRACTION OF PROTEIN FROM *PHASEOLUS AUREUS, PHASEOLUS VULGARIS* AND *PHASEOLUS LUNATUS* BEANS USING SODIUM CHLORIDE

[75] Inventor: Lowell D. Satterlee, Lincoln, Nebr.

[73] Assignee: Board of Regents of the University of Nebraska, Lincoln, Nebr.

[21] Appl. No.: 796,182

[22] Filed: May 12, 1977

Related U.S. Application Data

[63] Continuation-in-part of Ser. No. 593,460, Jul. 7, 1975, abandoned.

[51] Int. Cl.$^2$ .............................................. A23J 1/14
[52] U.S. Cl. ............................... 260/123.5; 426/431; 426/549; 426/556; 426/630; 426/656
[58] Field of Search ...................... 260/123.5; 426/431

[56] References Cited

U.S. PATENT DOCUMENTS

| | | | |
|---|---|---|---|
| 3,450,688 | 6/1969 | Melnychyn | 260/123.5 |
| 3,794,735 | 2/1974 | Newsom et al. | 260/123.5 X |

OTHER PUBLICATIONS

Powrie, J. Ag. & Food Chemistry, vol. 9, 1961, pp. 67–69.
Evans et al., J. Ag. & Food Chemistry, vol. 11, 1963, pp. 26–29.
J. of Food Science, vol. 40, (1975), pp. 81–84, Satterlee et al.
Journal of the American Chemical Society, vol. XVI, 1894, pp. 703–712, Osborne, 757–764, Osborne.
Murphy et al., 7th Research Conference on Dry Beans, Ithaca and Geneva, N.Y., 1964, pp. 63–65.

*Primary Examiner*—Howard E. Schain
*Attorney, Agent, or Firm*—Eyre, Mann, Lucas & Just

[57] ABSTRACT

Protein is extracted from *Phaseolus vulgaris, Phaseolus aureus* or *Phaseolus lunatus* beans with a sodium chloride solution of not over about 0.6% w/v NaCl and thereafter recovered as by separating the fibrous residue and acidifying the remaining aqueous extract to precipitate the protein. In a preferred embodiment heat is applied during acid precipitation to increase the yield of protein. The separated protein may be spray dried to form a bland tasting white powder which may be used to advantage to increase the protein content of baked goods.

9 Claims, No Drawings

EXTRACTION OF PROTEIN FROM *PHASEOLUS AUREUS, PHASEOLUS VULGARIS* AND *PHASEOLUS LUNATUS* BEANS USING SODIUM CHLORIDE

BACKGROUND OF THE INVENTION

The present application is a continuation-in-part of my previous application Ser. No. 593,460 filed July 7, 1975, now abandoned.

A major concern of food scientists today is the ever increasing need for an inexpensive source of nutritionally suitable protein. Various by-products from food processing have been studied and found to be relatively good, nutritionally adequate protein sources. The whey from milk, the bran from wheat, and the waste liquor from alfalfa preparation have all been found to be excellent sources of protein. Such products as fish protein concentrate have been developed with a high protein requirement in mind.

For many years, the soybean has been used as a protein supplement to animal feeds and also human foods. More recently soybean prices have risen dramatically and the total supply has been seriously reduced. Dry edible beans are commonly used in human diets. Though they are abundant in protein, they have traditionally been only a secondary source of protein to the homemaker. This limited usage is largely due to taste preferences and flatulence factors. Beans yield large amounts of protein per acre and constitute a valuable potential source of world protein.

The extraction of protein from dried beans has been studied by several investigators. W. D. Powrie reports in the Journal of Agricultural Food Chemistry 1961, volume 9, page 67 on the Extraction of Nitrogeneous Constituents from the Navy Bean; R. J. Evans and M. H. Kerr report in the Journal of Agricultural Food Chemistry 1963, volume 11, page 26 on the Protein Isolation, Extraction and Precipitation of Nitrogeneous Constituents of Dry Navy Beans and F. L. Murphy reports on the Preparation of Bland, Colorless, Non-Flatulent High Protein Concentrates from Dry Beans, page 63 of the 7th Research Conference on Dry Beans at Ithaca and Geneva, New York held by the Agricultural Research Service, U.S. Department of Agriculture. Up until now, however, dried beans have not been used as a regular raw material for extraction of protein.

SUMMARY OF THE INVENTION

The present invention is directed to an efficient and economical procedure for the extraction of commercially viable amounts of protein from dried beans. The extracted protein has essentially the same lysine and methionine content as does the whole bean and in general the biological value (BV) is slightly higher than protein from soybeans.

The process of the present invention is specifically directed to extracting protein from dried beans botanically named Phaseolus vulgaris, Phaseolus aureus and Phaseolus lunatus which include for example, kidney beans, navy beans, California small white beans, Pink, Pinto, Great Northern beans and lima beans. The protein is extracted from the natural bean without any pretreatment for removal of oil and the protein in one embodiment of the invention is extracted in its native state without being denatured as may occur in the extraction of soybean protein. The dried bean protein is bland without any appreciable bean flavor such as may be experienced with soybean protein. It may be spray dried to a white powder for increasing the protein content and enhancing the flavor and baking quality of cookies and other baked goods.

In accordance with the present invention, the selected dried beans either Phaseolus vulgaris, Phaseolus aureus or Phaseolus lunatus in finely divided state are mixed into an aqueous solution of sodium chloride of concentration of not more than about 0.6% w/v NaCl at ordinary room temperature. The sodium chloride solution quite readily dissolves or solubilizes the protein and in about thirty minutes the fibrous solids are removed as by filtration or in a centrifuge. The remaining liquid with the dissolved or solubilized protein is acidified to cause the protein to precipitate. The precipitated protein is separated as a concentrated paste which may be spray dried to a powder. Any ordinary acid may be used to precipitate the bean protein but hydrochloric acid is preferred.

This very efficient and inexpensive process is based on the unexpected discovery that an extremely dilute aqueous sodium chloride solution containing not over about 0.6% w/v NaCl is extremely effective for extracting protein from Phaseolus vulgaris, Phaseolus aureus or Phaseolus lunatus dried beans. Best results are achieved with an aqueous sodium chloride solution containing 0.2% w/v NaCl which appears to be the optimum concentration for the extraction of dried bean protein. The use of dilute aqueous sodium chloride solutions containing 0.2% w/v NaCl increases the extracted yield of protein from dried beans up to about 50% over the amount extracted with ordinary water. Significant advantage in yield is still experienced with sodium chloride solutions of 0.2 to 0.05% w/v NaCl concentration and there is advantage in merely adding some sodium chloride to the water used for extraction. When the concentration of the aqueous sodium chloride extraction solution exceeds 0.6% w/v NaCl to any extent there is a drastic reduction in the yield of extracted bean protein. For example, a 1.0% w/v NaCl solution will extract only about one-half the amount of bean protein that is oridinarily extracted with 0.5% w/v NaCl solution in accordance with the present invention and the amount of bean protein extracted with 1.0% w/v NaCl solution is less than the amount extracted with ordinary water.

Best results in yield of protein are obtained by acid precipitation of hot protein. Heat may be applied to the liquid before or during acid precipitation to raise the temperature above about 80° C and preferably to about 90° C. Acid precipitation of the hot protein at about 90° C. gives a very significant and surprising increase in yield. The extracted protein at the time of acid precipitation may be heated about 90° C. but there is no appreciable advantage in this and at temperatures above about 115° C., the protein starts to discolor, the yield begins to drop and a slight caramel flavor develops.

EXAMPLE 1

Bean flour was formed by passing dried Pink beans through a Hammermill. The bean flour contained about 20% by weight of protein. 2.0Kg. of the bean flour was mixed with 10.0 liters of sodium chloride solution containing 0.5% w/v NaCl and the slurry mixture was stirred for 40 minutes. The slurry was then centrifuged for 30 minutes at 8000 r.p.m. The supernatant was separated from the residue and acidified with 6.0N hydrochloric acid to a pH of about 3.5 to precipitate the proteins. The supernatant was again centrifuged for 30 minutes at 8000 r.p.m. to separate the bean proteins from the whey. The resulting bean protein concentrate was spray dried to a white bean protein concentrated powder.

EXAMPLES 2-4

The method of Example 1 was followed in separate runs using ordinary water, a sodium chloride solution of 1.0% w/v NaCl and a sodium chloride solution of 2.0% w/v NaCl.

Analyses were performed to determine the yield of percent protein in the bean protein concentrate (BPC) using the Official Methods of Analysis of the American Organization of Analytical Chemists (AOAC 1970) with the following results:

TABLE I

| Example | % NaCl Solution | BPC % Yield | Protein Content of BPC % |
|---|---|---|---|
| 1 | 0.0 | 7.04 | 71.5 |
| 2 | 0.5 | 8.96 | 84.5 |
| 3 | 1.0 | 3.70 | 88.5 |
| 4 | 2.0 | 3.76 | 88.0 |

EXAMPLES 5 and 6

The procedure of Example 1 was followed in separate runs using dried Great Northern beans extracted with a sodium chloride solution of 0.5% w/v NaCl and 1.0% w/v NaCl.

EXAMPLES 7 and 8

The procedure of Examples 5 and 6 was followed using dried Pinto beans with the following results:

TABLE II

| Example | % NaCl Solution | % Yield | Protein Content of BPC % |
|---|---|---|---|
| 5 | 0.5 | 11.32 | 78.0 |
| 6 | 1.0 | 5.34 | 74.0 |
| 7 | 0.5 | 9.96 | 89.3 |
| 8 | 1.0 | 3.62 | 90.0 |

EXAMPLE 9

The procedure of Example 1 was followed using dried Lima beans with the following results:

TABLE III

| Example | % NaCl Solution | % Yield | Protein Content of BPC % |
|---|---|---|---|
| 9 | 0.5 | 8.54 | 84.2 |

EXAMPLE 10

The procedure of Example 1 was followed using dried Great Northern beans and analyses were made using AOAC 1970 procedures to determine the proximate composition of the bean protein concentrate (BPC), residue and whey. In the following Table the carbohydrate content was determined by difference:

TABLE IV

| Fraction | % Protein | % Fat | % Ash | % Moisture | % Carbohydrate |
|---|---|---|---|---|---|
| Milled Bean | 20.76 | 3.12 | 4.36 | 10.23 | 61.53 |
| BPC | 84.38 | 0.97 | 1.60 | 2.85 | 10.20 |
| Dried Whey | 27.48 | 1.13 | 9.43 | 10.67 | 51.29 |
| Residue | 7.41 | 2.37 | 3.41 | 3.48 | 83.33 |

The dried residue and whey produced in accordance with the present invention have a potential use as animal feed because of the high carbohydrate and fiber content and relatively high protein content.

EXAMPLES 11-14

The method of Example 1 was followed in a number of separate runs to determine the yield of percent protein from different quality rejected dried beans. In Example 11 whole dried Great Northern beans were used. Example 12 were moldy Great Northern dried beans which were infected with the white mold Scheratini scleratiorum. Example 13 were split Great Northern dried beans and in Example 14 the Great Northern dried beans were wrinkled and off color. Protein extraction from rejected beans was as follows:

TABLE V

| Example | % Protein Raw Flour | % Protein in BPC | % Protein Dry When | % Protein in Residue |
|---|---|---|---|---|
| 11 | 21.8 | 77.90 | 29.46 | 10.30 |
| 12 | 22.59 | 79.79 | 24.92 | 15.64 |
| 13 | 20.52 | 84.85 | 24.58 | 12.48 |
| 14 | 22.62 | 79.19 | 32.09 | 15.50 |

Protein extracted from the Great Northern, Pink and Pinto dried beans in the preceeding examples was high in lysine content as compared to soy meal. Nutritional and digestibility studies of these bean proteins showed that gross digestibility is slightly lower than soy while biological value (BV) is slightly higher than soy. These bean proteins were used to advantage in bread and cookies to enhance the protein value. In bread, the protein content was increased by about 15% with acceptable crumb texture and with an expected drop in loaf volume. In sugar cookies, the protein content was increased by about 30% with enhanced width, height ratio or spread of the cookie during baking. In both cases there was no off color, objectionable aroma or flavor and the texture was normal.

The method of Example 1 was followed in a number of separate runs using good grade Great Northern beans and an increasing concentration of sodium chloride with the following results:

TABLE VI

| Example | % NaCl Solution | BPC % Yield | Protein Content of BPC % |
|---|---|---|---|
| 15 | 0.0 | 10.12 | 70.5 |
| 16 | 0.2 | 12.07 | 78.0 |
| 17 | 0.4 | 10.95 | 81.4 |
| 18 | 0.5 | 11.32 | 78.0 |
| 19 | 0.6 | 8.19 | 80.8 |
| 20 | 0.8 | 5.56 | 73.0 |

Referring to Table VI, it will be seen that there is a material reduction in the amount of extracted protein when the sodium chloride solution exceeds 0.6% w/v NaCl.

Studies were conducted to determine the effect of heat on acid precipitation of the dissolved or solubilized protein remaining in the liquid after separation of the fibrous solids.

EXAMPLE 20

A mixture of Phaseolus vuglaris and Phaseolus lunatus in the proportion of 33.2% of Michigan Navy, 23.6% Pinto, 10.2% Great Northern, 7.1% Red Kidney and 6.0% Lima beans were extracted in accordance with the procedure of Example 1 except that acid precipitation of the extracted protein was carried out at the following temperatures with the following results:

TABLE VII

| Acid Precipitation Temperature °C | BPC Yield % Original Bean Weight | Protein Yield % Original Bean Protein Weight |
|---|---|---|
| 25 | 11.84 | 39.74 |
| 60 | 10.31 | 39.77 |
| 70 | 9.07 | 33.97 |
| 80 | 10.86 | 37.83 |
| 90 | 17.72 | 52.10 |
| 100 | 17.20 | 53.80 |
| 110 | 16.20 | 50.06 |

It is believed that the significant increase in yield of protein above about 80° C. is due to the fact that the heat rapidly denatures the bean proteins which tend to become insoluble and are recovered in the BPC fraction instead of going off with the whey fraction. At above about 100° C. the yield begins to drop and above about 115° C. the protein discolors and a caramal flavor develops.

EXAMPLES 21-25

The procedure of Example 1 was followed in extracting protein from the following beans at the specified acid precipitation temperatures.

TABLE VIII

| Example of Bean Variety | Acid Precipitation Temperature °C | BPC Yield % Original Bean Weight | Protein Yield % Original Bean Protein Weight |
|---|---|---|---|
| 21 - Navy | 25 | 12.65 | 41.95 |
|  | 90 | 16.05 | 52.41 |
| 22 - Pinto | 25 | 15.50 | 53.23 |
|  | 90 | 16.70 | 57.18 |
| 23 - Great Northern | 25 | 15.55 | 46.96 |
|  | 90 | 17.90 | 55.14 |
| 24 - Kidney | 25 | 14.80 | 43.05 |
|  | 90 | 10.99 | 46.80 |
| 25 - Lima | 25 | 6.45 | 18.98 |
|  | 90 | 12.84 | 50.99 |

In all cases the yield of protein was significantly better by carrying out acid precipitation at about 90° C.

It will be understood that the claims are intended to cover all changes and modifications of the preferred embodiments of the invention herein chosen for the purpose of illustration which do not constitute a departure from the spirit and scope of the invention.

What is claimed is:

1. A method for producing a non-toxic, edible plant protein which comprises the steps of finely dividing one or more varieties of natural dried beans selected from the group consisting of *Phaseolus vulgaris, Phaseolus aureus* and *Phaseolus lunatus,* mixing the finely divided bean particles with an aqueous sodium chloride solution of concentration of not over about 0.6% w/v sodium chloride which extracts protein from the bean particles and separating the extracted protein from said mixture including the step of precipitating the protein with acid.

2. The method of claim 1 which includes the step of finely dividing the dried beans to the consistency of flour.

3. The method of claim 1 with includes the steps of centrifuging the said mixture to separate the mixture into a residue and supernatant, and acidifying the supernatant to precipitate the protein as a concentrated paste.

4. The method of claim 1 which includes the step of separating the extracted protein from said mixture by acid precipitation at a temperature of above about 80° C.

5. The method of claim 3 which includes the step of carrying out the acid precipitation at a temperature of about 90° C.

6. The method of claim 3 which includes the steps of centrifuging the said supernatant to separate the precipitated protein and then spray drying the separated protein.

7. A method for producing a non-toxic, edible plant protein which comprises the steps of mixing one or more varieties of finely divided natural beans selected from the group consisting of *Phaseolus vulgaris, Phaseolus aureus* and *Phaseolus lunatus* with a sodium chloride solution of not over about 0.6% w/v sodium chloride which separates protein from the bean particles, separating the solids from the resulting mixture, and then acidifying the mixture to precipitate protein therein.

8. The method of claim 7 which includes the step of carrying out the acid precipitation at a temperature above about 80° C.

9. A method for producing a non-toxic, edible plant protein which comprises the steps of finely dividing one or more varieties of dried beans selected from the group consisting of *Phaseolus vulgaris, Phaseolus aureus* and *Phaseolus lunatus,* mixing the finely divided bean particles with an aqueous sodium chloride solution of concentration of not over about 0.6% w/v sodium chloride which extracts protein from the bean particles, separating the liquid containing extracted protein from the mixture, heating the liquid containing extracted protein to a temperature above about 80° C. and precipitating the heated protein with acid.

* * * * *